United States Patent [19]

Harrington et al.

[11] 4,250,649
[45] Feb. 17, 1981

[54] D BITE LITE

[76] Inventors: Duane E. Harrington, c/o George Spector, 3615 Woolworth Bldg., 233 Broadway; George Spector, 3615 Woolworth Bldg., 233 Broadway, New York, both of N.Y. 10007

[21] Appl. No.: 3,637

[22] Filed: Jan. 15, 1979

[51] Int. Cl.³ .............................................. A01K 97/12
[52] U.S. Cl. ........................................................ 43/16
[58] Field of Search ................................. 43/15, 16, 17

[56] References Cited
U.S. PATENT DOCUMENTS

| 283,444 | 8/1883 | Wentworth | 43/15 |
| 2,850,831 | 9/1958 | Setterdahl | 43/15 |
| 3,091,881 | 6/1963 | Evans | 43/17 |
| 3,200,530 | 9/1965 | Dworski | 43/16 |

Primary Examiner—Nicholas P. Godici

[57] ABSTRACT

An attachment for a fishing rod, the attachment including a case secured to a fishing rod clamp, the containing a battery and lamp in circuit with a switch that is tripped closed by a pivotable lever having a loop on its end through which the fishing line extends, so that when a fish bites on a bait and tugs on the line, the lamp is lighted.

2 Claims, 4 Drawing Figures

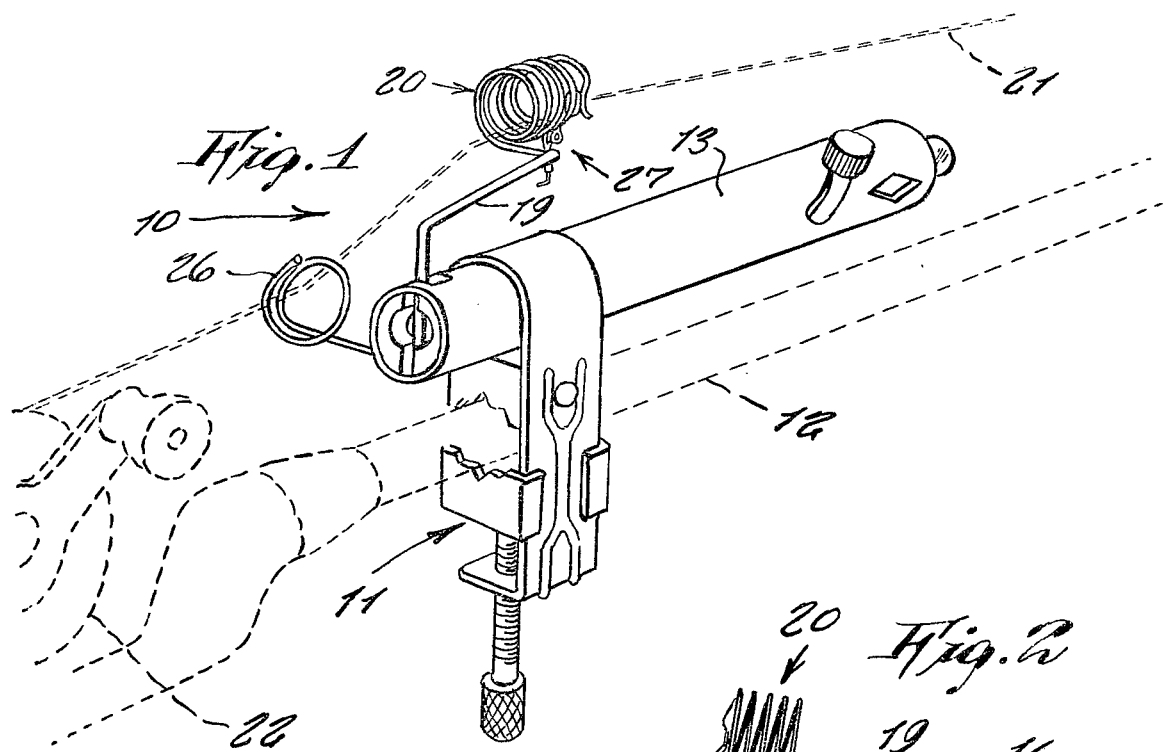
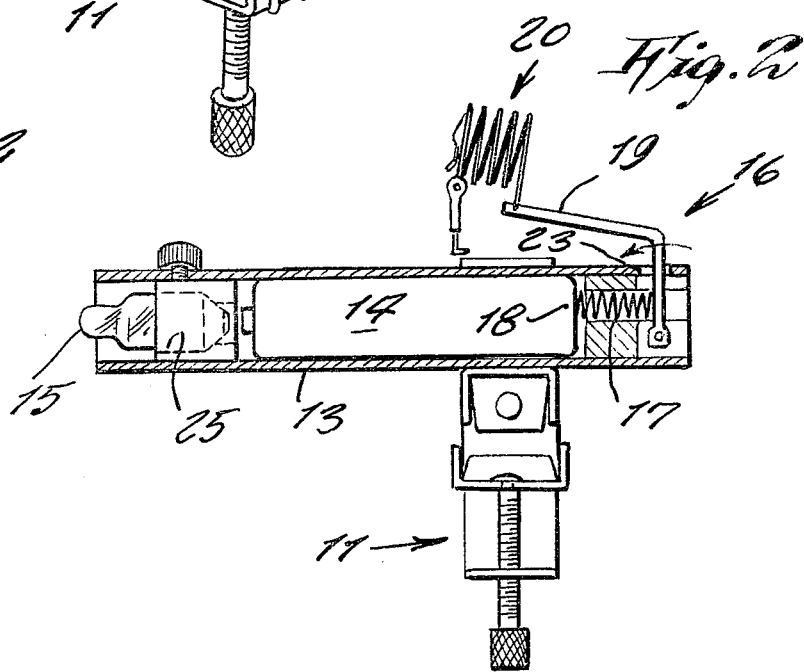
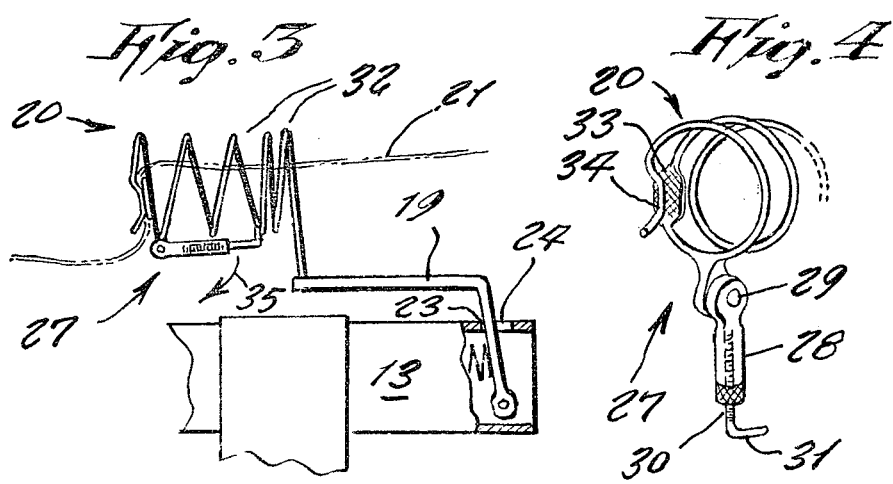

D BITE LITE

This invention relates generally to fishing accessories for sports fishermen.

It is well known to many sports fishermen that when fishing at night and with several fishing lines out in the water, that it is difficult to see when one of them is having a fish is biting, so that he may miss his chance to play the line and hook the fish. This situation is accordingly in want of an improvement.

Therefore, it is a principal object of the present invention to provide an accessory attachable on a fishing rod which will visually warn a fisherman by means of a light, when a fish is biting, so he can attend the line at once.

Another object is to provide a "D" BITE LITE which that eliminates the need of a fisherman to concentrate all his attention only on the lines, and permits his to do other nearby chores, such as readying other lines, and baiting hooks, as long as he is able to see if any light goes on.

Still another object is to provide a "D" BITE LITE which automatically gives the line a short tug if a fish nibbles on the bait, in order to hook the fish.

FIG. 1 is a perspective view of the invention shown mounted on a fishing pole.

FIG. 2 is an opposite side view thereof shown partly in cross section.

FIG. 3 is an enlarged side view detail of a coil spring thereof which shows to include means for automatically giving the line a jerk when a fish bites and gives an initial tug on the line, the jerk thus tending to imbed the hook more securely to the fish so it does not get away as sometimes happens if not fully hooked on the fishhook barb.

FIG. 4 is a perspective view thereof and showing the jerk mechanism comprising a tension coil spring that can be locked in selectively stretched condition so to snap jerk when a line is slightly tugged.

Referring now to the drawing in greater detail, the reference numeral 10 represents a "D" BITE LITE accessory, according to the present invention, and which includes an adjustable clamp 11 attachable around a side of a fishing rod 12. The clamp is affixed to a cylindrical case 13, containing a replaceable, dry cell battery 14 and an electric lamp 15 which are in circuit with a switch 16 comprised of a compression coil spring 17 contacting the battery rear end terminal 18, and a pivotable lever 19 engaging the spring 17, the lever having a tension spring, coiled loop 20 on its end through which a fishing line 21 extends on its way from a reel 22, so that when a fish bites on a bait and pulls the line, the lever pivots so to touch an edge 23 of a hole 24 through which it extends so to close the circuit, and thus light up the lamp, the lamp contact 25 being grounded to the case.

Another coiled loop 26 is supported at a side of the case so to direct therethrough the line 21 at a proper angle toward the loop 20 in order to trip the lever when a fish bites.

The present invention includes a mechanism 27 that gives the line a short, quick tug in case a fish nibbles on the bait so to hook the fish. The mechanism includes a brace 28 pivoted on a pin 29 at one end of the coiled loop 20, the opposite end of the brace having an extension 30 screwed therein so to selectively project either more or less therefrom. An outer end of the extension is bent at right angle to form a foot 31 for being braced against any one of the turns 32 of the loop 20 so to selectively stretch the loop more or less as wished, as shown in FIG. 3.

A pad 33 is formed on a last turn of the loop 20, the pad surface being knurlled, and an end of the loop has an offset jaw 34 so to bear against the pad.

A fishing line passing through loop 20 is grasped between the jaw 34 and pad 33 when the mechanism is set as shown in FIG. 3. Then when a fish pulls slightly on the line, the foot falls down from its bracing position as shown by arrow 35 so to cause the coil to snap into contracted position and thus give a short tug at the bait so to hook a fish.

All parts are made of stainless steel so to prevent corrosion when wet.

What is claimed:

1. An accessory attached to a fishing rod, comprising in combination a clamp for grasping around said fishing rod, a case affixed to said clamp, an electric lamp and dry cell battery inside said case, and a switch on said case for closing a circuit between said lamp and battery, said switch including a pivotable lever, and an outer end of said lever including a tension coil spring loop through which a fishing line extends to a reel of said fishing rod, and said lever including means to give said line a short, quick tug when a fish nibbles on a bait so to hook the same, wherein said means includes a pivotable brace at one end of said loop, a foot on a free end of said brace for bracing against a selected turn of said loop, and a knurlled pad and jaw at one end of said loop for grasping said line therebetween.

2. The combination as set forth in claim 1 wherein second coiled loop is secured to a side of said case for said line to pass therethrough, and be at a proper angle toward the first said loop in order to pivot said lever.

* * * * *